(12) United States Patent
Gneuss et al.

(10) Patent No.: US 9,061,442 B2
(45) Date of Patent: Jun. 23, 2015

(54) EXTRUDER

(71) Applicants: Detlef Gneuss, Bad Oeynhausen (DE); Stephan Gneuss, Bad Oeynhausen (DE); Daniel Gneuss, Charlotte, NC (US)

(72) Inventors: Detlef Gneuss, Bad Oeynhausen (DE); Stephan Gneuss, Bad Oeynhausen (DE); Daniel Gneuss, Charlotte, NC (US)

(73) Assignee: GNEUSS GMBH, Bad Oeynhausen (DE)

(*) Notice: Subject to any disclaimer, the term of this patent is extended or adjusted under 35 U.S.C. 154(b) by 0 days.

(21) Appl. No.: 14/187,427

(22) Filed: Feb. 24, 2014

(65) Prior Publication Data

US 2014/0245891 A1 Sep. 4, 2014

(30) Foreign Application Priority Data

Mar. 1, 2013 (DE) .......................... 10 2013 003 380

(51) Int. Cl.
| | |
|---|---|
| *B29B 7/84* | (2006.01) |
| *B29C 47/42* | (2006.01) |
| *B29C 47/36* | (2006.01) |
| *B29C 47/50* | (2006.01) |
| *B29C 47/76* | (2006.01) |
| *B29C 47/00* | (2006.01) |

(52) U.S. Cl.
CPC .............. *B29B 7/847* (2013.01); *B29C 47/42* (2013.01); *B29C 47/0009* (2013.01); *B29C 47/366* (2013.01); *B29C 47/50* (2013.01); *B29C 47/767* (2013.01)

(58) Field of Classification Search
CPC .... B29C 47/40; B29C 47/402; B29C 47/404; B29C 47/408; B29C 47/42; B29C 47/48
USPC ......... 425/203, 204; 366/75, 76.4, 83, 85, 89, 366/291, 301
See application file for complete search history.

(56) References Cited

U.S. PATENT DOCUMENTS

| 2,754,542 | A | * | 7/1956 | Henning et al. | ............... 425/202 |
| 3,825,236 | A | * | 7/1974 | Hussmann et al. | .......... 366/76.1 |
| 5,106,198 | A | * | 4/1992 | Muller | .......................... 425/203 |
| 7,513,677 | B2 | | 4/2009 | Gneuss | |

FOREIGN PATENT DOCUMENTS

DE 19617662 A 9/1997

\* cited by examiner

*Primary Examiner* — Timothy Kennedy
(74) *Attorney, Agent, or Firm* — Andrew Wilford

(57) ABSTRACT

An extruder has an intake barrel, a degassing drum connected to, downstream from, and coaxial with the intake barrel, and an output barrel connected to, downstream from, and coaxial with the intake barrel and degassing drum. A driven shaft extends through the drum and barrels and is rotated for forming a plastic melt and advancing the melt through the intake barrel, degassing drum, and output barrel. A plurality of degassing screws surround the driven shaft in the degassing drum. A screw guide rotationally fixed to the shaft has respective seats for the degassing screws. Respective drive gears rotationally fixed but removably mounted on the degassing screws are received in respective seats in a gear guide separate from the screw guide and rotationally fixed to the shaft. A ring gear is rotationally fixed but removably mounted in the degassing drum and meshes with the drive gears.

13 Claims, 3 Drawing Sheets

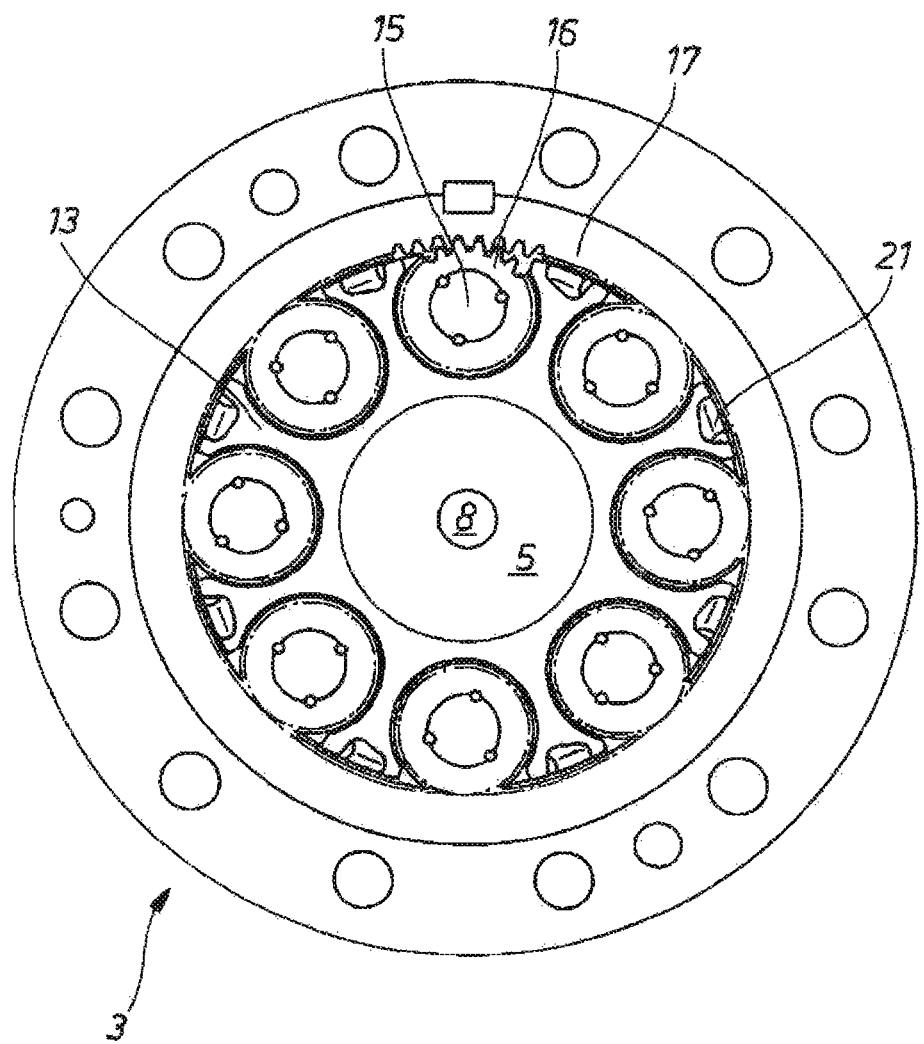

EXTRUDER

FIELD OF THE INVENTION

The present invention relates to an extruder. More particularly this invention concerns an extruder with a degassing system.

BACKGROUND OF THE INVENTION

An extruder for producing a polymer melt typically has an intake barrel for taking in, melting, and kneading plastic granules, bottle flakes, or fibers, a degassing drum attached to the intake barrel and drum having a multiple-screw extruder assembly, and an output barrel for discharging the polymer melt. The extruder further has a driven shaft that at least at the degassing drum has for its multiple planet screws a guide body rotationally fixed by a support to the shaft and provided between an upstream cone and a downstream cone. The planet screws have drive gears that at their ends mesh with at least one ring gear fixed in the degassing drum. Thus as the driven shaft rotates about its axis, the planet screws are rotated, thoroughly kneading and mixing the melt passing axially through the extruder and allowing gaseous inclusions to escape at the degassing drum.

In an extruder is disclosed in U.S. Pat. No. 7,513,677 the ratio between the rotation speed and the exact implementation of the geared connection between the planet-screw gears and the ring gear must be coordinated with each other as a function of the polymer to be processed and the required processing task. The use of a more throughput-efficient bevel gearing or spur gearing can be advantageous, depending on the processing task. The ratio for rotation speeds determines degassing efficiencies. Adjust-ment of the rotation speeds requires different bore diameters for the guide body at least at the gearing.

If extruder as set forth in U.S. Pat. No. 7,513,677 is to process different materials, the multiple-screw extruder assembly must be completely removed from the degassing drum and replaced with planet screws of a different pitch and/or with gears of different gear ratios. Typically, however, it is not the extruder screws, but preferably the drive gears and the ring gears that have to be replaced by components of different gear ratios.

The prior art in principle thus requires the entire guide body with its planet screws to be replaced, despite the fact that what is generally required is only a modification of the gears.

OBJECTS OF THE INVENTION

It is therefore an object of the present invention to provide an improved extruder.

Another object is the provision of such an improved extruder that overcomes the above-given disadvantages, in particular that is where a rapid and cost-effective conversion of the multiple-screw extruder assembly at the degassing drum is possible.

SUMMARY OF THE INVENTION

An extruder for producing a polymer melt has according to the invention an intake barrel extending along an axis and defining a melt-travel direction, a degassing drum connected to, downstream from, and coaxial with the intake barrel, and an output barrel connected to, downstream from, and coaxial with the intake barrel and degassing drum. A driven shaft extends along the axis through the drum and barrels and is rotated for forming a plastic melt and advancing the melt in a travel direction sequentially through the intake barrel, degassing drum, and output barrel. A plurality of axially extending degassing screws surround and are angularly spaced around the driven shaft in the degassing drum. A screw guide rotationally fixed to the shaft has respective seats for the degassing screws. Respective drive gears rotationally fixed but removably mounted on the degassing screws are received in respective seats in a gear guide separate from the screw guide and rotationally fixed to the shaft. A ring gear is rotationally fixed but removably mounted in the degassing drum and meshes with the drive gears.

What this achieves is that the rotation-speed change necessitated by selecting a different polymer can be implemented cost-effectively and rapidly simply by replacing the transmission composed of the drive gears, the gear guide, and the ring gear, with elements that have a different relative speed ratio. It is obviously also possible to do a more cost-effective replacement of the degassing screws in response to varying levels of wear, for example after varying periods of use for the gearing and degassing screws, even if for example the gearing does not have to be replaced at the same time.

It is advantageous if the at least two guides can be mounted by splines, preferably a multi-splined arrangement, to the shaft in a rotationally fixed manner so that they can be push-fitted onto the shaft.

This approach allows the guides to be removed individually, and whenever a different gear ratio needs to be selected, the gears and guide can be replaced with different parts, for example a gear guide having larger bores for larger drive gears, without necessarily having to remove the other guide along with the degassing screws from the degassing drum. It is obviously also possible also to remove both guides together with the degassing screws and drive gears from the degassing drum, then to proceed in the uninstalled state separately whereby only individual elements, for example the drive gears, possibly together with the associated guide or the degassing screws, are replaced as necessary with the respective guide. After replacement and reassembly, all of the elements can then be installed together as a module into the degassing drum.

An approach has proven successful whereby the degassing screws have a support on at least one of their ends, onto which support the drive gears can be push-fitted in a rotationally fixed but releasable fashion.

As a result, the drive gears can be easily detached from the respective degassing screws, thereby enabling the drive gears to be replaced rapidly and cost-effectively.

It is advantageous for the guides to be provided between an upstream cone that is push-fitted and thereby rotationally fixed on the shaft and a downstream cone that is push-fitted and also rotationally fixed on the shaft.

The upstream and downstream cones ensure an improved flow for the polymer melt in the extruder. If the upstream cone and/or downstream cone are not permanently attached to the guide, these cones do not for example have to be replaced with corresponding guides whenever the geared elements and/or degassing screws are changed, and this in turn provides savings in terms of cost.

An especially advantageous embodiment is provided by having the gear guide abut the downstream cone.

This allows the degassing drum to easily opened from the output side and the gears to be removed. It is of course possible for drive and ring gears to be provided at both ends of the degassing screws. In this case, however, the gears would have to be removed from the two ends, or the degassing screws located between them would have to be removed at the same time from one side, and then only the two gears inexpensively replaced with gears of a different gear ratio.

However, it is obviously also possible for the upstream cone and the downstream cone to each be permanently attached to one of the guides.

In one embodiment at least the cross-section of the gear guide preferably is formed with adjustable bypass grooves or passages through which adjustable volumes of polymer melt can be conveyed in order to reduce the flow resistance moving past the drive gears to the degassing screws.

These bypass grooves or passages allow the flow of polymer melt to be optimally adjusted while moving toward the degassing screws, and optionally away from these degassing screws. The upstream and/or downstream cone can also advantageously themselves have bypass grooves or bypass passages that connect to the bypass grooves or bypass passages of the guide bodies.

A significant aspect is the fact that the shaft is divided at least in two, that the division of the shaft is located at the degassing drum, that the at least two parts of the shaft are connected in a rotationally fixed manner to each other by screwthreads, that each shaft part is formed with at least one shoulder on which one of the guides and/or input and/or downstream cones is supported axially, and that at least the guides are clamped to each other axially by action of the screwthreads.

This shaft that can be bolted together enables the multiple-screw extruder assembly to be provided with a space-saving design. No additional devices are required to retain the individual components. Furthermore, these components simultaneously ensure that the sealing elements between the individual components are prestressed.

It is recommended that the shaft have at least one longitudinal passage and that a temperature-control medium be passed through the longitudinal passage.

The temperature-control medium typically is a coolant, although it is optionally also possible for a heating medium to be initially passed through the longitudinal passages, for example when the extruder apparatus is heated.

The shaft is advantageously provided in the intake barrel and/or output barrel in the form of a screw, or carries a screw that can be push-fitted on the shaft in a rotationally fixed manner.

BRIEF DESCRIPTION OF THE DRAWING

The above and other objects, features, and advantages will become more readily apparent from the following description, reference being made to the accompanying drawing in which:

FIG. 3 is a cross section through the extruder.

SPECIFIC DESCRIPTION OF THE INVENTION

Figure 1:
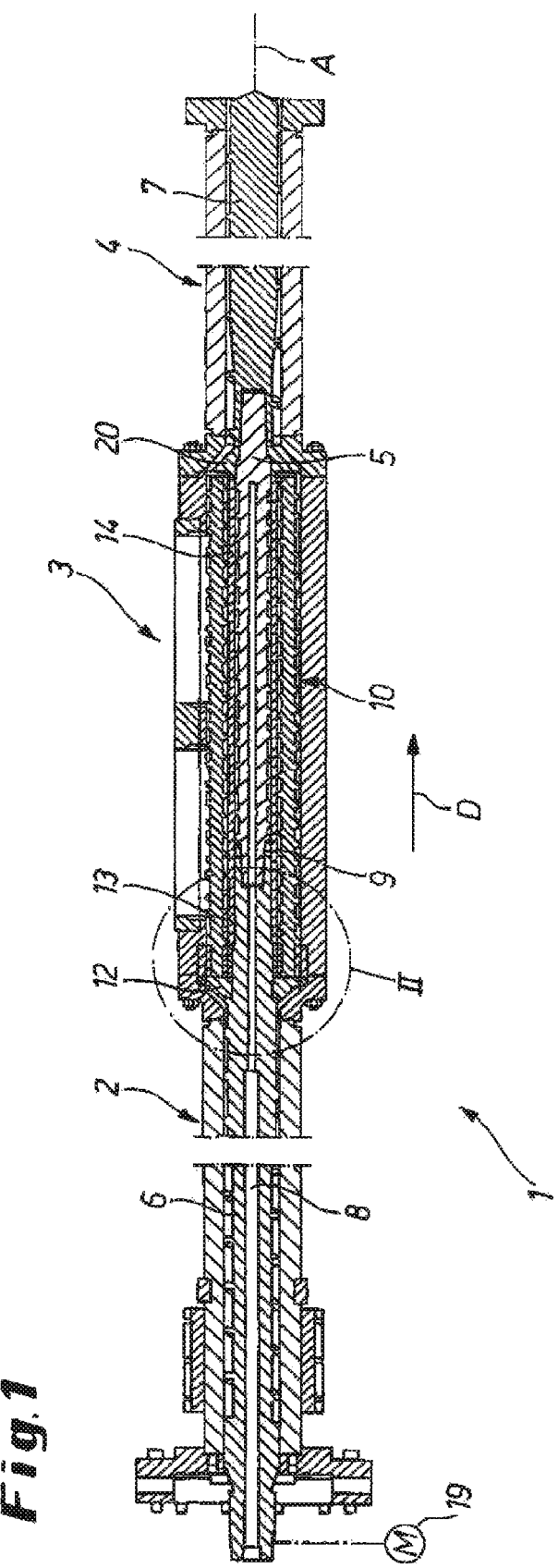
FIG. 1 is an axial section through an extruder according to the invention.

As seen in FIG. 1 an extruder 1 has an intake barrel 2, a degassing drum 3, and an output barrel 4. A shaft 5 passes through the extruder 1 along an axis A and is formed as a screw 6 in the intake barrel 2 and as a screw 7 in the output barrel 4. The shaft 5 is formed with passages 8 and 21 through which passes a temperature-control medium. A motor 19 rotates the shaft 5 about its axis A to move a polymer melt axially in a travel direction D through the upstream intake barrel 2, then through the degassing drum 3, then through the downstream output barrel 4.

The shaft 5 has two parts joined together in the degassing drum 3 by screwthreads 9. A multiple-screw extruder assembly 10 is carried on the shaft 5 in the degassing drum 3.

Figure 2:
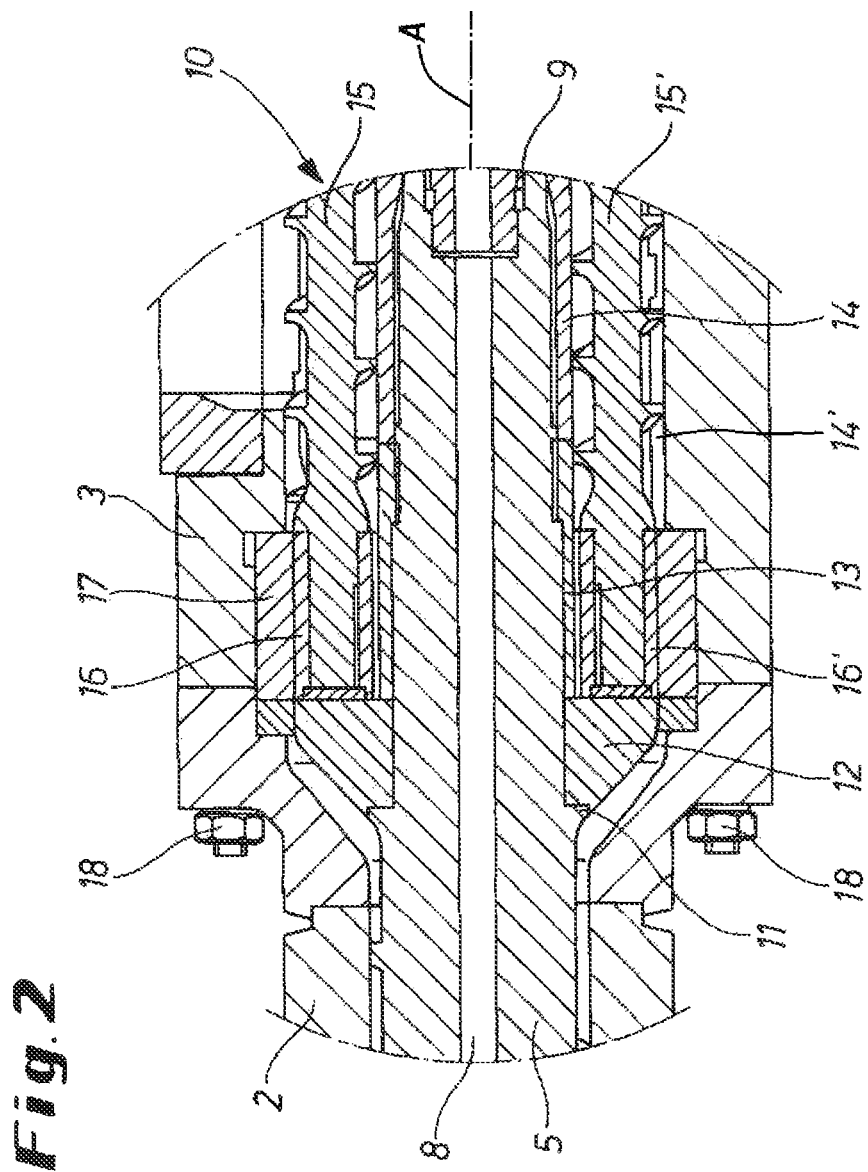
FIG. 2 is an enlarged view of the detail indicated at II in FIG. 1.

FIG. 2 is an enlarged detail in the upstream end of the degassing drum 3 and shows the assembly 10 in more detail. The shaft 5 is formed with a shoulder 11 against which an upstream cone 12 is braced that can be push-fitted onto the shaft 5 so as to be rotationally fixed thereon. This cone 12 can be unitary with the gear guide 13. Downstream of the upstream cone 12 is a gear guide 13 that is rotationally fixed to the shaft 5, followed by a screw guide 14. The screw guide 14 is formed with radially outwardly open and axially extending grooves forming seats 14' (FIG. 2 only) holding planet or degassing screws 15 and 15'. The ends of the degassing screws 15 and 15' extend into the gear guide 13. Drive gears 16 and 16' in seats of the gear guide 13 are splined onto the ends of the degassing screws 15 and 15' and mesh with a ring gear 17 that is rotationally fixed in the degassing drum 3.

The degassing drum 3 is attached by bolts 18 to the intake barrel 2. When the bolts 18 are removed, the degassing drum 3 can be opened and, after the screwthreads 9 have been unscrewed from each other, the drive gears 16 and optionally the gear guide 13 can be replaced. This allows the gear ratios to be changed rapidly and easily without having to extract the screw guide 14 and the degassing screws 15 from the degassing drum 3.

We claim:

1. An extruder for producing a polymer melt, the extruder comprising:
    an intake barrel extending along an axis and defining a melt-travel direction;
    a degassing drum connected to, downstream from, and coaxial with the intake barrel;
    an output barrel connected to, downstream from, and coaxial with the intake barrel and degassing drum;
    a driven shaft extending along the axis through the drum and barrels;
    means for rotating the shaft for forming a plastic melt and advancing the melt in the travel direction sequentially through the intake barrel, degassing drum, and output barrel;
    a plurality of axially extending degassing screws surrounding and angularly spaced around the driven shaft in the degassing drum;
    a screw guide rotationally fixed to the shaft and having respective seats for the degassing screws;
    respective drive gears rotationally fixed but removably mounted on the degassing screws;
    a gear guide separate from the screw guide, rotationally fixed to but removably mounted on the shaft, and having respective seats holding the drive gears;
    a ring gear rotationally fixed but removably mounted in the degassing drum and meshing with the drive gears; and
    upstream and downstream cones mounted on the shaft and axially flanking the guides and degassing screws.

2. The extruder defined in claim 1, wherein the ring and gear guides are secured by axially extending splines to the shaft.

3. The extruder defined in claim 1, wherein the drive gears are splined to the respective degassing screws.

4. The extruder defined in claim 1, wherein the gear guide axially abuts the downstream cone.

5. The extruder defined in claim 4, wherein the upstream cone is fixed permanently to the gear guide and the downstream cone is fixed to the downstream cone.

6. The extruder defined in claim 4, wherein the gear guide is fixed to one of the cones.

7. The extruder defined in claim 6, wherein the gear guide is unitary with the one cone.

8. An extruder for producing a polymer melt, the extruder comprising:
   an intake barrel extending along an axis and defining a melt-travel direction;
   a degassing drum connected to, downstream from, and coaxial with the intake barrel;
   an output barrel connected to, downstream from, and coaxial with the intake barrel and degassing drum;
   a driven shaft extending along the axis through the drum and barrels;
   means for rotating the shaft for forming a plastic melt and advancing the melt in a travel direction sequentially through the intake barrel, degassing drum, and output barrel;
   a plurality of axially extending degassing screws surrounding and angularly spaced around the driven shaft in the degassing drum;
   a screw guide rotationally fixed to the shaft and having respective seats for the degassing screws;
   respective drive gears rotationally fixed but removably mounted on the degassing screws;
   a gear guide separate from the screw guide, rotationally fixed to the shaft, formed with passages through which a coolant can be passed, and having respective seats holding the drive gears; and
   a ring gear rotationally fixed but removably mounted in the degassing drum and meshing with the drive gears.

9. An extruder for producing a polymer melt, the extruder comprising:
   an intake barrel extending along an axis and defining a melt-travel direction;
   a degassing drum connected to, downstream from, and coaxial with the intake barrel;
   an output barrel connected to, downstream from, and coaxial with the intake barrel and degassing drum;
   a driven shaft extending along the axis through the drum and barrels;
   means for rotating the shaft for forming a plastic melt and advancing the melt in the travel direction sequentially through the intake barrel, degassing drum, and output barrel;
   a plurality of axially extending degassing screws surrounding and angularly spaced around the driven shaft in the degassing drum;
   a screw guide rotationally fixed to the shaft and having respective seats for the degassing screws;
   respective drive gears rotationally fixed but removably mounted on the degassing screws;
   a gear guide separate from the screw guide, rotationally fixed to but removably mounted on the shaft, and having respective seats holding the drive gears, the gear guide being formed with adjustable passages through which adjustable volumes of polymer melt can be conveyed in order to reduce flow resistance moving past the drive gears to the degassing screws; and
   a ring gear rotationally fixed but removably mounted in the degassing drum and meshing with the drive gears.

10. The extruder defined in claim 1 wherein the shaft is formed by an upstream part in one of barrels and a downstream part in the degassing drum and the other barrel, the upstream and downstream parts having interengaging screwthreads joining them axially together.

11. An extruder for producing a polymer melt, the extruder comprising:
    an intake barrel extending along an axis and defining a melt-travel direction;
    a degassing drum connected to, downstream from, and coaxial with the intake barrel;
    an output barrel connected to, downstream from, and coaxial with the intake barrel and degassing drum;
    a driven shaft extending along the axis through the drum and barrels;
    means for rotating the shaft for forming a plastic melt and advancing the melt in the travel direction sequentially through the intake barrel, degassing drum, and output barrel;
    a plurality of axially extending degassing screws surrounding and angularly spaced around the driven shaft in the degassing drum;
    a screw guide rotationally fixed to the shaft and having respective seats for the degassing screws;
    respective drive gears rotationally fixed but removably mounted on the degassing screws;
    a gear guide separate from the screw guide, rotationally fixed to but removably mounted on the shaft, and having respective seats holding the drive gears;
    a ring gear rotationally fixed but removably mounted in the degassing drum and meshing with the drive gears; and
    upstream and downstream cones mounted on the shaft and axially flanking the guides and degassing screws, the upstream part being formed with a shoulder bearing axially downstream on the upstream cone and the downstream part being formed with a shoulder bearing axially upstream on the downstream cone such that screwing together the upstream and downstream parts axially clamps the guides between the cones.

12. The extruder defined in claim 1, wherein the shaft is formed with at least one axial passage adapted for the throughflow of a temperature-control fluid.

13. The extruder defined in claim 1, wherein the shaft is formed as a screw in each of the barrels.

* * * * *